(12) United States Patent
Narayan et al.

(10) Patent No.: US 9,499,671 B2
(45) Date of Patent: Nov. 22, 2016

(54) HYDROPHILIC POLYSILOXANE COMPOSITIONS CONTAINING CARBINOL GROUPS

(71) Applicants: Ramani Narayan, Okemos, MI (US); Daniel Graiver, Midland, MI (US); Sudhanwa Dewasthale, Lansing, MI (US)

(72) Inventors: Ramani Narayan, Okemos, MI (US); Daniel Graiver, Midland, MI (US); Sudhanwa Dewasthale, Lansing, MI (US)

(*) Notice: Subject to any disclaimer, the term of this patent is extended or adjusted under 35 U.S.C. 154(b) by 0 days.

(21) Appl. No.: 14/514,481

(22) Filed: Oct. 15, 2014

(65) Prior Publication Data

US 2016/0108179 A1 Apr. 21, 2016

(51) Int. Cl.
*C08G 77/388* (2006.01)

(52) U.S. Cl.
CPC .................... *C08G 77/388* (2013.01)

(58) Field of Classification Search
None
See application file for complete search history.

(56) References Cited

U.S. PATENT DOCUMENTS

| | | | | |
|---|---|---|---|---|
| 3,355,424 A * | 11/1967 | Brown | ................... | C08G 77/26 |
| | | | | 528/30 |
| 4,591,652 A | 5/1986 | DePasquale | | |
| 4,757,121 A | 7/1988 | Tanaka et al. | | |
| 4,895,964 A | 1/1990 | Marigada | | |
| 5,001,210 A * | 3/1991 | Coury | ................ | C08G 18/3831 |
| | | | | 528/85 |
| 5,100,991 A | 3/1992 | Cray | | |
| 5,593,611 A | 1/1997 | Czech | | |
| 5,686,547 A * | 11/1997 | Nye | ....................... | A61K 8/893 |
| | | | | 525/474 |
| 6,153,717 A | 11/2000 | Chung | | |
| 6,346,593 B1 | 2/2002 | Hupfield | | |
| 7,799,434 B2 * | 9/2010 | Webster | ............... | C08G 77/388 |
| | | | | 428/447 |
| 2004/0110659 A1* | 6/2004 | Herault | .................. | A61K 8/068 |
| | | | | 510/499 |
| 2007/0224355 A1* | 9/2007 | Menovcik | ............. | C08G 71/04 |
| | | | | 427/387 |
| 2007/0260010 A1* | 11/2007 | Herzig | ................. | C08G 77/458 |
| | | | | 524/588 |

FOREIGN PATENT DOCUMENTS

EP   A2 0 399 706   11/1990

* cited by examiner

*Primary Examiner* — Robert S Loewe

(57) ABSTRACT

Preparation and use of organopolysiloxanes having carbinol groups that are bonded to the silicon atom through carbamate-containing groups. These hydrophilic polysiloxanes can be made to completely dissolve in water or behave as amphoteric surfactants by controlling the concentration of the carbinol radicals and the molecular weight of the polysiloxane.

10 Claims, No Drawings

HYDROPHILIC POLYSILOXANE COMPOSITIONS CONTAINING CARBINOL GROUPS

BACKGROUND

There is a growing need for siloxane polymers that are hydrophilic and can be made to dissolve in water or act as amphoteric surfactants in aqueous solutions. One chemical modification method to enhance the hydrophilic properties of polysiloxanes is to graft copolymerize polysiloxanes with polyethers. This chemical modification was extensively used to prepare various silicone surfactants.

However, it commonly involves ethoxylatian or propoxylation of the polymer backbone, using ethylene oxide or propylene oxide and requires special equipment and facilities due to the toxic and explosive nature of the oxides.

Another common method is to hydrosilylate polysiloxanes containing methyl hydrogen radicals with vinyl terminated hydrophilic polyethers as published in "Silicone Surfactants" by Randal M. Hill, Ed. Surfactant Science Series Vol. 86, Marcel Dekker Pub. New York, N.Y., 1999. The copolymer products of this reaction are useful as surfactants and their hydrophilic-lipophilic balance (HLB) is directly related to the ratio of the hydrophobic siloxanes to the hydrophilic ether composition. However, this method is deficient since increasing the polyether content in the copolymers in order to increase the water solubility leads to lower polysiloxane content and a loss of the other desirable polysiloxane inherent properties.

Introduction of various hydrophilic functional groups such as quaternary ammonium salts (QAS) or hydroxyalkyl groups have also been used to enhance the hydrophilic properties of polysiloxanes. Here too, increasing the content of these groups will increase the hydrophilic nature of the polysiloxane. This method is effective but the solubility of such polysiloxanes greatly depends on the pH of the water and any additive present in the aqueous solution. Similarly, introduction of amine or carboxylic pendant radicals onto the silicone polymer chain that will form soluble salts in aqueous acid or alkaline solutions, respectively, is known to enhance the hydrophilicity of these polysiloxanes.

For example, U.S. Pat. No. 4,895,964 to Margida, Jan. 23, 1990 discloses a process for the manufacture of quaternary ammonium pendant siloxane copolymers by the reaction of epoxy pendant siloxane copolymers with a tertiary amine acid salt.

U.S. Pat. No. 5,593,611 to Czech, Jan. 14, 1997, U.S. Pat. No. 6,346,593 to Hupfield, Feb. 12, 2002 and U.S. Pat. No. 6,153,717 to Chung, Nov. 28, 2000 disclose the preparation of aminopolysiloxanes. The aminopolysiloxanes are conveniently prepared by hydrolyzing and condensing aminofunctional dialkoxysilanes with water in the presence of heat and a base catalyst. However, as such these amino-functional polysiloxane are hydrophobic. There are only a few examples in the prior art where amino-functional polysiloxanes were further reacted to enhance the hydrophilic nature of polysiloxanes.

U.S. Pat. No. 4,757,121 to Tanaka et al., Jul. 12, 1988, discloses an amino-substituted organopolysiloxane that contains hydroxyl groups or alkoxy groups. This polysiloxane was reacted with epoxy-containing alkoxysilanes to form a crosslinked film.

U.S. Pat. No. 5,100,991 to Cray, Feb. 22, 1996, discloses compounds that were prepared by the reaction of an aminofunctional silane or siloxane with a lactone.

EP A2 0 399 706 by Cray, published on Nov. 28, 1990, discloses a method for preparing a treatment agent for fibrous materials by hydroxyl-functional polysiloxanes that were prepared from the reaction of amine-containing organosiloxane with a monoepoxide. The resulting product had primary, secondary, and tertiary amine groups.

Polyhydroxyl silanes or siloxanes are disclosed in U.S. Pat. No. 4,591,652 to DePasquale, May 27, 1986. These compounds were obtained by reacting an amine terminated silane, preferably an amine terminated polyalkoxysilane, with an aldonic acid lactone in the presence of an alcohol under inert atmosphere. The preferred aldonic acid lactone in this patent is δ-gluconolactone. The water soluble products from this disclosure were claimed to be useful as insoluble coatings for various substrates.

It is the object of the present disclosure to provide polysiloxanes containing multiple pendant or terminal carbinol functional groups connected to carbamate functional groups that enhances the hydrophilic nature of the polysiloxanes. It is further the objective of this disclosure to provide examples of using these polysiloxanes as film coatings with desirable surface properties, intermediates in the manufacturing in polyurethane and polyester manufacturing, as well as their use as amphoteric surfactants in aqueous solutions.

THE DISCLOSURE

The instant disclosure deals with polysiloxanes containing multiple hydroxyl groups (carbinols) that impart high hydrophilicity to the polysiloxanes and render them completely soluble in water. The pendant and terminal carbinol radicals are formed by the reaction of amino functional silicones with cyclic carbonates.

This disclosure relates to polyol-functional siloxane copolymers with the general formula:

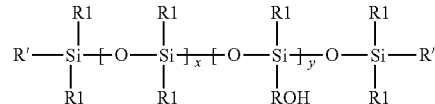

where x and y are integers equal or greater than zero, R1 is a monovalent hydrocarbon alkyl radical selected from the group consisting of methyl, alkyl and propyl, preferably methyl or an aryl radical such as phenyl, tolyl, and xylyl and aralkyl such as benzyl and phenethyl. Alkyl groups are preferred, and methyl is particularly preferred. ROH is a carbinol radical having the following structure:

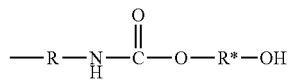

where R and R* are monovalent hydrocarbon alkylene groups such as ethylene, propylene, butylene, isobutylene, and methylpropylene, preferably propylene and ethylene respectively. R' is either R1 or ROH but if both x and y are zero than R' can only be equal to ROH.

This disclosure further relates to a method for preparing the carbinol-functional polysiloxane. The method comprises reacting an amine-functional siloxane with a cyclic carbonate compound. The amine-functional polysiloxane is prepared by base equilibration using a catalyst known in the art.

A preferred method comprises heating a composition comprising a low molecular weight polydiorganosiloxane, an endblocker, an amine-functional silane or amine-functional siloxane and water in the presence of the catalyst and equilibrating the reaction mixture up to 150° C. for a predetermined period of time. The endblocker is used to control the molecular weight and can be hexamethyldisiloxane or aminopropyldimethylmethoxysilane. While heating, a mild strip is applied to the system to remove by-products such as water and alcohol. After the amino functional polysiloxane is obtained, the reaction mixture can be stripped to remove low boiling impurities from the product.

DETAILED DESCRIPTION

In a particularly preferred embodiment of the disclosure, the amino-functional polysiloxane is prepared by a conventional polycondensation process comprising, for example: heating a mixture of silanol terminated dimethylsiloxane oligomers, aminopropyl-dimethoxymethylsilane, and hexamethyldi-siloxane endblocker in the presence of a catalyst. Then, gradually reducing the pressure to promote condensation and removing water and methanol by-products from the reaction mixture. The catalyst can be selected from the group consisting of barium hydroxide, trisodium orthophosphate or similar base catalysts.

Polycondensation is achieved by heating the reaction mixture for a period of time, typically, the mixture is heated up to 85° C. for up to 3 hours. The by-products formed in the process are water and alcohol and they are removed by reducing the pressure typically down to 200 mBar and stripping them out of the reaction mixture. After the viscosity of the product is stabilized, the pressure is adjusted to ambient and the product is cooled in an inert atmosphere.

A similar procedure is used for the preparation of carbinol terminated polysiloxane where silanol terminated dimethylsiloxane oligomers are reacted under the same conditions with aminopropyldimethylmethoxysilane endblocker. The reaction process is identical but the product of this reaction is a linear polydimethylsiloxane terminated with an amino-functional radical. The molecular weight of this polysiloxane is controlled by the amount of the aminopropyldimethylmethoxysilane endblocker.

The amino-functional polysiloxane thus obtained is then reacted with cyclic carbonate to produce the desired carbinol-functional polysiloxane. Preferred carbonates are cyclic ethylene carbonate or cyclic glycerol carbonate. The preferred reaction conditions are to add the melted carbonate slowly into the reaction mixture and maintain a reaction temperature of 80° C. by controlling the rate of addition. The following schematics illustrate examples of the fundamental reactions used in this disclosure.

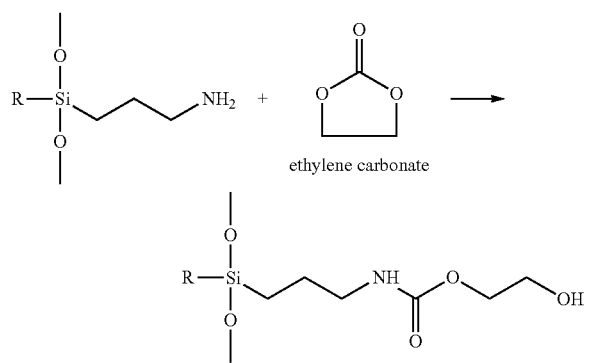

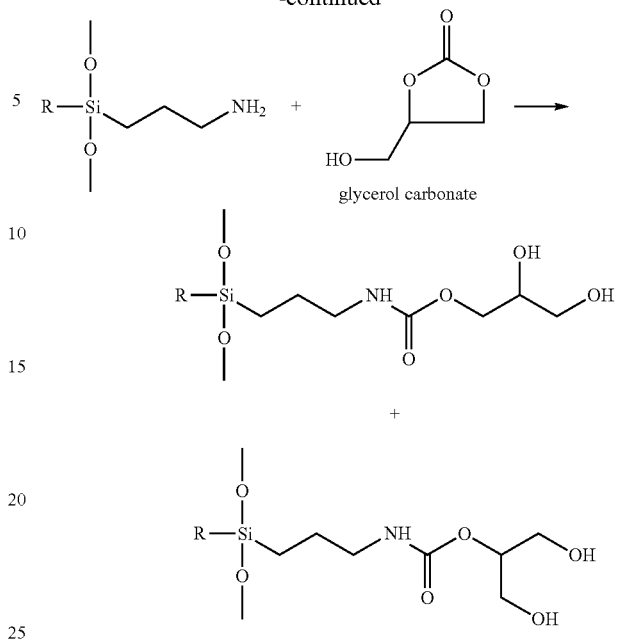

The reaction to form the polysiloxane-carbinols requires no catalyst, no solvent, provides no byproducts and is obtained in a high yield.

The materials are useful in polyurethane chemistries, such as additives for polyurethane foams and castables, textile treatments, hair care products, paper coatings, facial tissues, viscosity modifiers, and they can be converted to hydrogels by crosslinking methods.

EXAMPLES

These examples are intended to illustrate the disclosure to those skilled in the art and should not be interpreted as limiting the scope of the disclosure set forth in the claims.

Example 1

3-aminopropyldiethoxymethylsilane (191 grams, 1 mole), 36 g (2 moles) of distilled water and 1.4 g (0.009 moles) of hexamethyldisiloxane (HMDSO) were combined in a 500 mL round bottom flask equipped with a mechanical stirrer, condenser and a Dean Stark trap. The mixture was allowed to react for 3 hours at room temperature until a homogeneous clear solution was obtained. The hydrolyzate mixture was then heated at 110° C. for 4 hours to strip water and ethanol to complete the polymerization. The resulting pendant aminofunctional polysiloxane was then stripped by heating at 150° C. under full vacuum and the stripped polymer was cooled to 80° C.

The amine functional polysiloxane that was obtained was placed in a 2 L Parr reactor and was purged with nitrogen to ensure an inert atmosphere. Ethylene carbonate (88 grams, 1 mole) was then added at 80° C. and the mild exothermic reaction temperature was maintained at this temperature by adjusting the addition rate of ethylene carbonate. Once all ethylene carbonate was added, agitation was continued for an hour to ensure complete reaction.

Example 2

3-aminopropyldimethylethoxysilane (3.0 gr), distilled water (36 gr), potassium silanolate (1.0 gr) and 16-32 cSt silanol terminated dimethylsiloxane oligomers (240 gr) were combined in a 500 mL round bottom flask equipped with a mechanical stirrer, condenser and a Dean Stark trap. The mixture was allowed to react for 3 hours at room temperature until a homogeneous clear solution was obtained. The hydrolyzate mixture was then heated at 110° C. for 4 hours to strip water and ethanol to complete the polymerization. Dry ice was added to neutralize the base catalyst. The resulting terminal aminofunctional polysiloxane was then stripped by heating at 150° C. under full vacuum and the stripped polymer was cooled to 80° C.

The amine functional polysiloxane that was obtained was placed in a 2 L Parr reactor and was purged with nitrogen to ensure an inert atmosphere. Ethylene carbonate (176 gr) was then added at 80° C. and the mild exothermic reaction temperature was maintained at this temperature by adjusting the addition rate of ethylene carbonate. Once all ethylene carbonate was added, agitation was continued for an hour to ensure complete reaction.

Example 3

3-aminopropyldiethoxymethylsilane (80.5 grams, 0.5 mole), 16-32 cSt silanol terminated dimethylsiloxane oligomers (300 gr), 36 g (2 moles) of distilled water and 1.4 g (0.009 moles) of hexamethyldisiloxane (HMDSO) were combined in a 500 mL round bottom flask equipped with a mechanical stirrer, condenser and a Dean Stark trap. The mixture was allowed to react for 3 hours at room temperature until a homogeneous clear solution was obtained.

The hydrolyzate mixture was then heated at 110° C. for 4 hours to strip water and ethanol to complete the polymerization. The resulting pendant aminofunctional polysiloxane was then stripped by heating at 150° C. under full vacuum and the stripped polymer was cooled to 80° C.

The amine functional polysiloxane that was obtained was placed in a 2 L Parr reactor and was purged with nitrogen to ensure an inert atmosphere. Ethylene carbonate (44 gr, 0.5 mole) was then added at 80° C. and the mild exothermic reaction temperature was maintained at this temperature by adjusting the addition rate of ethylene carbonate. Once all ethylene carbonate was added, agitation was continued for an hour to ensure complete reaction.

What is claimed is:

1. Carbinol-functional siloxane copolymers having the general formula:

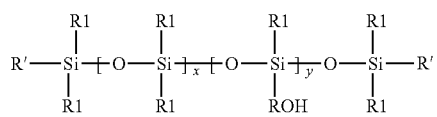

where x is an integer greater than zero and y is an integer greater than zero, $R^1$ is a monovalent hydrocarbon alkyl radical selected from the group consisting of methyl, ethyl, and propyl, aryl radicals selected from the group consisting of phenyl, tolyl, and xylyl, and aralkyl radicals selected from the group consisting of benzyl and phenethyl, where the group ROH is a carbinol radical having the general formula:

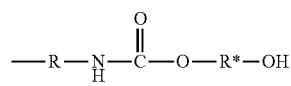

where R and R* are divalent hydrocarbon alkylene radicals selected from the group consisting of ethylene, propylene, butylene, isobutylene, and methylpropylene, R' is selected from R1 or ROH.

2. A hydrophilic polysiloxane as claimed in claim 1 where R' is $R^1$.

3. A hydrophilic polysiloxane as claimed in claim 1 where R' is ROH.

4. A process for making a hydrophilic polysiloxane containing pendant carbinol functional groups having the general formula:

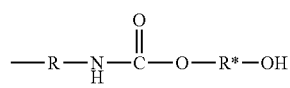

wherein R and R* are divalent hydrocarbon alkylene radicals selected from the group consisting of ethylene, propylene, butylene, isobutylene, and methylpropylene, said method comprising reacting substantially equimolar quantities of pendant aminosiloxanes with cyclic carbonate.

5. A process for making a hydrophilic polysiloxane containing pendant carbinol functional groups having the general formula:

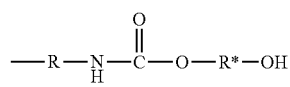

wherein R and R* are divalent hydrocarbon alkylene radicals selected from the group consisting of ethylene, propylene, butylene, isobutylene, and methylpropylene, said method comprising:

A. heating a mixture of silanol terminated dimethylsiloxane oligomers, an aminosilane, and a siloxane endblocker, in the presence of a catalyst;

B. heating the mixture of A. for a predetermined period of time at a temperature no greater than 150° C.;

C. reducing any pressure incurred to promote condensation;

D. removing any water and any alcohol by-products from the reaction mixture

E. reacting the amino-functional polysiloxane from D. in a melted condition with cyclic carbonate at less than 100° C. to produce the desired carbinol-functional polysiloxane.

6. A process as claimed in claim 5 wherein the cyclic carbonate is selected from the group consisting of cyclic carbonates.

7. A process for making hydrophilic polysiloxane containing pendant and terminal carbinol functional groups having the general formula:

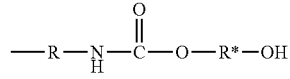

wherein R and R* are divalent hydrocarbon alkylene radicals selected from the group consisting of ethylene, propylene, butylene, isobutylene, and methylpropylene, by reacting substantially equimolar quantities of pendant and terminal aminosiloxanes with cyclic carbonate.

8. A process for making a hydrophilic polysiloxane containing terminal carbinol functional groups having the general formula:

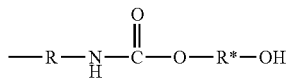

wherein R and R* are divalent hydrocarbon alkylene radicals selected from the group consisting of ethylene, propylene, butylene, isobutylene, and methylpropylene, said method comprising:
- A. heating a mixture of silanol terminated dimethylsiloaxane oligomers, an aminosilane, and a siloxane endblocker, in the presence of a catalyst;
- B. heating the mixture of A. for a predetermined period of time at a temperature no greater than 150° C.;
- C. reducing any pressure incurred to promote condensation;
- D. removing any water and any alcohol by-products from the reaction mixture;
- E. reacting the amino-functional polysiloxane from D. in a melted condition with cyclic carbonate at less than 100° C. to produce the desired carbinol-functional polysiloxane.

9. A process as claimed in claim 8 wherein the cyclic carbonate is cyclic ethylene carbonate.

10. A process for making hydrophilic polysiloxane containing copolymers containing both terminal and pendant

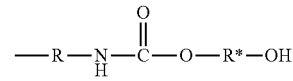

groups, wherein R and R* are divalent hydrocarbon alkylene radicals selected from the group consisting of ethylene, propylene, butylene, isobutylene, and methylpropylene, said method comprising:
- A. heating a mixture of silanol terminated dimethylsiloxane oligomers and dimethylsiloxane oligomers containing pendant silanol groups, an aminosilane, and a siloxane endblocker, in the presence of a catalyst;
- B. heating the mixture of A. for a predetermined period of time at a temperature no greater than 85° C.;
- C. reducing any pressure incurred to promote condensation;
- D. removing any water and an alcohol by-products from the reaction mixture;

reacting the amino-functional polysiloxane from D. in a melted condition with cyclic carbonate at less than 100° C. to produce the desired carbinol-functional polysiloxane.

* * * * *